(12) United States Patent
Howorth et al.

(10) Patent No.: US 9,470,127 B2
(45) Date of Patent: *Oct. 18, 2016

(54) POLLUTION CONTROL DEVICE STRUCTURE WITH LOWER FRICTION SURFACE AND UNDERLYING HIGHER FRICTION SURFACE

(71) Applicant: 3M INNOVATIVE PROPERTIES COMPANY, St. Paul, MN (US)

(72) Inventors: Gary F. Howorth, Oakdale, MN (US); Dale L. May, Knapp, WI (US); Andrew B. Supina, Lake Elmo, MN (US); David S. Seitz, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/989,141

(22) Filed: Jan. 6, 2016

(65) Prior Publication Data

US 2016/0115833 A1 Apr. 28, 2016

Related U.S. Application Data

(63) Continuation of application No. 13/996,287, filed as application No. PCT/US2011/065966 on Dec. 20, 2011, now Pat. No. 9,238,981.

(60) Provisional application No. 61/425,883, filed on Dec. 22, 2010.

(51) Int. Cl.
*B01D 50/00* (2006.01)
*D06N 7/04* (2006.01)
(Continued)

(52) U.S. Cl.
CPC .......... *F01N 3/0211* (2013.01); *B29C 65/4875* (2013.01); *B29C 65/4885* (2013.01); *B29C 66/712* (2013.01); *B29C 66/7316* (2013.01); *B29C 66/7379* (2013.01);
(Continued)

(58) Field of Classification Search
CPC ....... F01N 3/24; F01N 3/0211; B32B 25/10; B32B 27/12; B32B 27/40; Y10T 428/24355; Y10T 428/24372
USPC ........ 422/177, 179, 180; 427/402, 403, 415; 428/142, 143
See application file for complete search history.

(56) References Cited

U.S. PATENT DOCUMENTS 6,242,071 B1 6/2001 Yamada
7,820,117 B2 10/2010 Peisert
(Continued)

OTHER PUBLICATIONS

PCT International Search Report for PCT/US2011/065966, mailed Apr. 11, 2012.

*Primary Examiner* — Tom P Duong (57) ABSTRACT

A structure comprising at least one inorganic layer comprising inorganic materials suitable for use in a pollution control device. A friction-inducing material is disposed on at least one side of the inorganic layer. The deposited friction-inducing material defines a higher friction area exhibiting a static coefficient of friction higher than that of the inorganic materials. A lower friction layer is disposed so as to cover at least a portion of the higher friction area and define an exposed surface area of the structure. The exposed surface area exhibits a lower static coefficient of friction than that of the higher friction area. The lower friction layer no longer covers a substantial portion of the higher friction area, after the pollution control device is assembled.

20 Claims, 2 Drawing Sheets

(51) Int. Cl.

| | |
|---|---|
| *B05D 1/36* | (2006.01) |
| *F01N 3/021* | (2006.01) |
| *F01N 3/28* | (2006.01) |
| *F01N 3/24* | (2006.01) |
| *B32B 7/12* | (2006.01) |
| *B32B 25/10* | (2006.01) |
| *B32B 25/20* | (2006.01) |
| *B32B 27/12* | (2006.01) |
| *B32B 27/30* | (2006.01) |
| *B32B 27/32* | (2006.01) |
| *B32B 27/36* | (2006.01) |
| *B32B 27/40* | (2006.01) |
| *B29C 65/48* | (2006.01) |
| *B29C 65/00* | (2006.01) |
| *B32B 5/02* | (2006.01) |
| *B32B 37/24* | (2006.01) |
| *B29K 505/02* | (2006.01) |
| *B29L 31/14* | (2006.01) |

(52) U.S. Cl.
CPC ............... *B29C 66/74* (2013.01); *B32B 5/02* (2013.01); *B32B 7/12* (2013.01); *B32B 25/10* (2013.01); *B32B 25/20* (2013.01); *B32B 27/12* (2013.01); *B32B 27/30* (2013.01); *B32B 27/32* (2013.01); *B32B 27/36* (2013.01); *B32B 27/40* (2013.01); *B32B 37/24* (2013.01); *F01N 3/24* (2013.01); *F01N 3/2853* (2013.01); *F01N 3/2864* (2013.01); *B29K 2505/02* (2013.01); *B29K 2623/065* (2013.01); *B29K 2995/0072* (2013.01); *B29L 2031/14* (2013.01); *B32B 2037/243* (2013.01); *B32B 2262/10* (2013.01); *B32B 2264/10* (2013.01); *B32B 2307/716* (2013.01); *B32B 2307/744* (2013.01); *B32B 2307/748* (2013.01); *B32B 2323/043* (2013.01); *B32B 2471/04* (2013.01); *B32B 2475/00* (2013.01); *Y02T 10/20* (2013.01); *Y10T 428/24355* (2015.01); *Y10T 428/24372* (2015.01)

(56) References Cited

U.S. PATENT DOCUMENTS

| | | | |
|---|---|---|---|
| 7,854,905 | B2 | 12/2010 | Yasuda |
| 7,858,051 | B2 | 12/2010 | Sako |
| 8,124,022 | B2 | 2/2012 | Howorth |
| 8,124,023 | B2 | 2/2012 | Ohshika |
| 8,226,897 | B2 | 7/2012 | Kunze |
| 8,231,835 | B2 | 7/2012 | Tabata |
| 2002/0127154 | A1 | 9/2002 | Foster et al. |
| 2004/0234436 | A1 | 11/2004 | Howorth |
| 2007/0084171 | A1 | 4/2007 | Kaneko |
| 2008/0175764 | A1 | 7/2008 | Sako |
| 2009/0025377 | A1 | 1/2009 | Yasuda |
| 2009/0041967 | A1 | 2/2009 | Tomosue |

POLLUTION CONTROL DEVICE STRUCTURE WITH LOWER FRICTION SURFACE AND UNDERLYING HIGHER FRICTION SURFACE

The present invention relates to pollution control devices, in particular to materials used in a pollution control device, and more particularly, to a structure that has at least one lower friction surface and at least one underlying higher friction surface for use in a pollution control device.

BACKGROUND

There are different types of devices used to control the level of polluting gases exiting from the exhaust of an internal combustion engine. Such pollution control devices include catalytic converter, diesel particulate and other engine exhaust filters or traps, as well as devices that combine both catalytic and filtering or trapping functions. Various techniques for assembling such pollution control devices are known. Each of these techniques include mounting (i.e., canning) a pollution control element (e.g., a catalytic element, exhaust filter, etc.) within a housing, by positioning the pollution control element inside of the housing and disposing a mounting material, typically in mat or sheet form, in the gap between the pollution control element and the housing. The sheet-shaped mounting mats are wrapped around the exterior of the pollution control element. Mounting materials have also been molded into a cylindrical or tubular shaped mounting mat and slipped over the pollution control element, or insert molded around the pollution control element (e.g., a monolithic catalytic element). After the mounting mat is disposed around the pollution control element, the resulting assembly is canned. Conventional canning techniques include the use of mechanical stuffing (e.g., using a stuffing cone), tourniquet, and clamshell canning operations that result in the mounting mat being disposed within the gap between the can or housing and pollution control element.

The mounting material is required to apply sufficient mounting pressure to prevent movement of the pollution control element within the housing during the operation of the pollution control device. At the same time, pollution control elements are typically relatively fragile. Therefore, the pressure exerted by the mounting material must be kept low enough to prevent the pollution control element from being crushed. In addition, the gap between the housing and the pollution control element can change significantly during the operation of the pollution control device. This gap can also vary somewhat as the result of the differences in manufacturing tolerances and material choices between the pollution control element and the housing. As a result, the mounting material also needs to be resilient enough to maintain an acceptable level of mounting pressure as this gap changes.

There is a continuing need for improving the techniques and materials used in assembling pollution control devices. The present invention provides a structure and technique for use in assembling a pollution control device.

SUMMARY OF THE INVENTION

In accordance with one aspect of the present invention, a structure is provided that comprises (a) at least one inorganic layer (e.g., in the form of a web, sheet or mat) comprising inorganic materials suitable for a pollution control element in a housing of a pollution control device, with the at least one inorganic layer having opposite sides and each side defining a major surface area; (b) a friction-inducing material disposed on at least a portion of the major surface area, of at least one of the sides of the at least one inorganic layer, so as to define a higher friction area exhibiting a static coefficient of friction higher than that of the inorganic materials; and (c) a lower friction layer disposed so as to cover at least a portion of the higher friction area and define an exposed surface area of the structure, with the exposed surface area exhibiting a lower static coefficient of friction than that of the higher friction area. The lower friction layer is operatively adapted so as to no longer cover a substantial portion of the higher friction area, after the structure has been used to mount a pollution control element in a housing of a pollution control device.

It can be desirable for the structure to further comprise an optional bonding layer disposed so as to adhere the friction-inducing material on at least the portion of the major surface area of at least one of the sides of the at least one inorganic layer. The bonding layer may at least partially adhere at least part of the lower friction layer to the at least one inorganic layer so as to cover at least a portion of the higher friction area.

In another aspect of the present invention, a pollution control device is provided that comprises a housing; a pollution control element mounted in the housing; and a structure according to the present invention. The structure is disposed between the pollution control element and the housing.

In an additional aspect of the present invention, a method is provided for making a structure. The method comprises:

(a) providing at least one inorganic layer comprising inorganic materials suitable for a pollution control element in a housing of a pollution control device, with the at least one inorganic layer having opposite sides, and each of the opposite sides defining a major surface area;

(b) disposing a friction-inducing material on at least a portion of the major surface area, of at least one of the sides of the at least one inorganic layer, so as to define a higher friction area exhibiting a static coefficient of friction higher than that of the inorganic materials; and (c) disposing a lower friction layer so as to cover a portion of the higher friction area and define an exposed surface area of the structure, with the exposed surface area exhibiting a lower static coefficient of friction than that of the higher friction area, wherein the lower friction layer is operatively adapted so as to no longer cover a substantial portion of the higher friction area, after the structure has been used to mount a pollution control element in a housing of a pollution control device.

It can be desirable for the method to further comprise disposing an optional bonding layer so as to adhere the friction-inducing material on at least the portion of the major surface area of at least one of the sides of the at least one inorganic layer. The bonding layer may be applied so as to at least partially adhere at least part of the lower friction layer to the at least one inorganic layer.

The lower friction layer facilitates the canning of the pollution control element with the structure and can also reduce the amount of wear experienced by the tools (e.g., a stuffing cone) used in canning (e.g., stuffing) a pollution control element into a housing with a conventional friction inducing structure like those structures disclosed in US Patent Application Publication Nos. 2008/0175764 and 2009/0025377, which are incorporated herein by reference in their entirety. Therefore, it can be beneficial to perform a conventional mechanical type (e.g., stuffing, tourniquet and clamshell) canning technique using the present invention. For example, by lowering the initial coefficient of friction of one or both major surfaces of the structure, the structure can be less likely damaged during the canning process.

Such damage may include one or a combination of structure rolling, shearing in the plane of the structure, tearing of the structure, or breakage of the fibers, which can reduce the durability and performance of the structure. When the coefficient of friction is too high between the structure and the housing during a stuffing operation, the structure can slip and become displaced from its desired position on the pollution control element. Canning with structures having too high of a coefficient of friction can also cause scuffing, tearing, cracking, and bunching of the structure, which can result in localized areas of the structure having higher or lower than desired structure densities, or pinching of the structure (e.g., as the housing is tightened around the pollution control element during a tourniquet or clamshell process).

In addition, when canning a pollution control element (e.g., a ceramic element) using a structure having friction-inducing material (e.g., abrasive material) on one or both of its major surfaces, the housing or the pollution control element or both may be damaged during the canning process. In particular, for example, the friction-inducing material can scratch or gouge the surface(s) of the housing and/or pollution control element brought in contact with the corresponding surface of the structure during the canning process. Such scratching and/or gouging may accelerate corrosion (e.g., rusting) of, for example, a metal housing surface. Such scratches and/or gouges may also act as stress concentrators that accelerate the initiation and propagation of cracks formed in, for example, the surface of a pollution control element made of ceramic material. Because they are relatively brittle, compared to most metals, ceramic materials are crack sensitive. Since ceramic monolithic pollution control elements (e.g., catalytic converter elements) are thin walled structures, the formation and propagation of cracks can rapidly cause the ceramic element to fracture and fail while in use. Therefore, by lowering the initial coefficient of friction of one or both major surfaces of such a friction enhanced structure, damage to the housing, the pollution control element, or both, during the canning process may be reduced or even prevented.

As used herein, a lower friction layer is a layer that is (a) frictionless (i.e., exhibits a very low static coefficient of friction of about 0.15 or even lower), (b) exhibits a degree of friction that is low enough to make it easy to mount a pollution control element in a housing with the structure (i.e., exhibits a static coefficient of friction in the range of from about 0.15 up to about 0.40), or (c) at least exhibits a static coefficient of friction that is less than that exhibited by the friction-inducing material and that is low enough to make it possible to mount a pollution control element in a housing with the structure. The lower friction layer can be a continuous or discontinuous layer.

As used herein, a portion of the friction-inducing material is considered covered by the lower friction layer, when that portion of the friction-inducing material is prevented from being exposed because of being (a) disposed underneath the lower friction layer, (b) embedded inside or otherwise disposed within of the lower friction layer, or (c) both (a) and (b). In addition, the friction-inducing material is considered substantially covered by the lower friction layer, when the covered friction-inducing material does not hinder, does not inhibit or at least does not prevent a corresponding pollution control element from being mounted in a housing using the structure.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a structure that comprises "an" inorganic layer can be interpreted to mean that the structure includes "one or more" inorganic layers.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.) and any range within that range. In addition, unless expressly indicated otherwise, any numerical range recited herein with a lower limit and an upper limit shall include the upper and lower limits within the range.

The above summary of the present invention is not intended to describe each disclosed embodiment or every implementation of the present invention. The description that follows more particularly exemplifies illustrative embodiments. In this application, guidance is provided through examples, which examples can be used in various combinations. In each instance, the recited examples serve only as a representative group and should not be interpreted as an exclusive list.

DETAILED DESCRIPTION OF CERTAIN EMBODIMENTS

In describing preferred embodiments of the invention, specific terminology is used for the sake of clarity. The invention, however, is not intended to be limited to the specific terms so selected, and each term so selected includes all technical equivalents that operate similarly.

Figure 1:
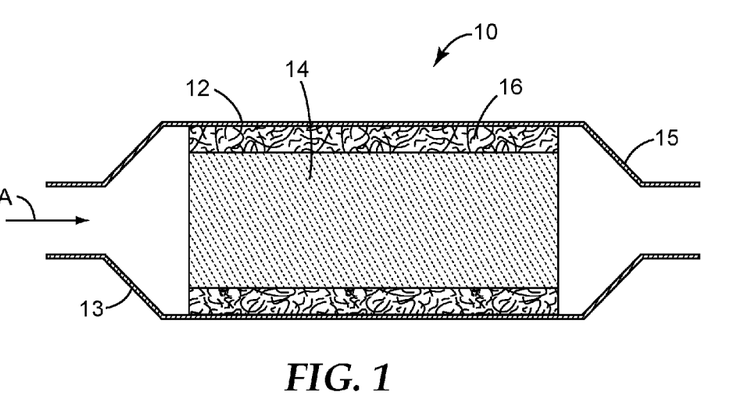
FIG. 1 is a cross-sectional side view of one embodiment of a pollution control device in accordance with the present invention.

Referring to FIG. 1, an exemplary pollution control device 10 according to the present invention comprises a housing 12, a pollution control element 14 mounted in the housing 12, and a mounting mat 16 disposed between the pollution control element 14 and the housing 12 so as to mount or otherwise secure the element 14 at a desired position within the housing 12. For example, a pollution control element 14 can be considered mounted in a housing 12, after the mat 16 is wrapped around the pollution control element 14 and the resulting wrapped element is inserted and secured at a desired location within the housing (i.e., canned). The housing 12 can include a cone-shaped inlet 13, through which exhaust gasses flow into the device 10 (see arrow A), and a cone-shaped outlet 15, through which the exhaust gasses flow out of the device 10.

Figure 2:
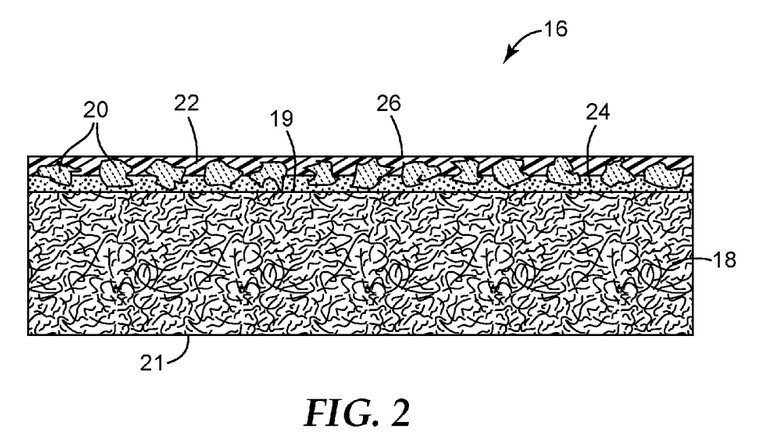
FIG. 2 is a cross-sectional side view of a mounting mat structure used in the pollution control device of FIG. 1.

Referring to FIG. 2, a mounting mat 16 according to the present invention can comprise one or more inorganic layers 18, a friction-inducing material 20, and a frictionless, low friction or at least a lower friction layer 22. The at least one inorganic layer 18 comprises inorganic materials suitable for mounting a pollution control element in a housing of a pollution control device, with the at least one inorganic layer 18 having opposite sides or major faces 19 and 21, and each side or major face defining a major surface area. The friction-inducing material 20 can be in the form of a continuous or discontinuous layer. The friction-inducing material 20 can be bonded to or otherwise disposed on all, most or at least a substantial portion of one or both of the major surface areas of the at least one inorganic layer 18 so as to define a higher friction area. For example, one or more layers of the friction-inducing material 20 may be simply deposited (e.g., sprayed or sprinkled) so as to lay on the surface of the inorganic layer(s) 18. Optionally, the friction-inducing material 20 may be adhered to the inorganic layer(s) 18 with, for example, an organic and/or inorganic adhesive, binder and/or size. The higher friction area exhibits a static coefficient of friction higher than that of the inorganic materials of layer(s) 18. An optional continuous or discontinuous bonding layer 24 can be used, when desired, to adhere the friction-inducing material 20 to one or both sides 19 and 21 of the inorganic layer(s) 18.

The friction-inducing material 20 may be bonded or adhered to the inorganic layer(s) 18 without the need for a separate bonding layer. In one embodiment, the bonding layer 24 may also function as the lower friction layer 22, for example, when the friction-inducing material 20 is embedded completely, mostly or at least substantially in a matrix of the bonding layer 24, and the material forming the bonding layer 24 exhibits the desired lower static coefficient of friction. The friction-inducing material 20 is considered substantially embedded, when enough of the material 20 is not exposed that the bonding layer 24 functions as the lower friction layer 22. In another embodiment, all, most or at least a substantial number of the friction-inducing particles, whiskers, fibers or other material 20 can each be coated with an adhesive or other suitable bonding agent.

The lower friction layer 22 functions as a sacrificial layer disposed so as to cover all, most or at least a substantial portion of the higher friction area and defines an initially exposed surface area 26 of the mounting mat 16. The lower friction layer 22 covers a substantial portion of the higher friction area of the friction-inducing material 20, when the exposed surface area 26 of the lower friction layer 22 exhibits a lower static coefficient of friction than that of the underlying higher friction area of the friction-inducing material 20. The bonding layer 26 may also function to completely, mostly, or at least partially adhere all, most or at least part of the lower friction layer 22 to the inorganic layer(s) 18. For example, when the friction-inducing material 20 covers only a portion of the bonding layer 26 and the remaining exposed portion of the bonding layer 26 is tacky or can become tacky (e.g., when heated), the exposed portion of the bonding layer 26 may be available for bonding the lower friction layer 22 to the inorganic layer(s) 18. The lower friction layer 22 may also function to adhere or bond the friction-inducing material 20 to the surface of the inorganic layer(s) 18, for example, by choosing a thermoplastic polymeric material for the lower friction layer 22 and heating the layer 22 until it becomes tacky and flows so as to bond the friction-inducing material 20 to the inorganic layer(s) 18. In another embodiment, a curable adhesive could be used for the lower friction layer 22, where the adhesive has the desired lower coefficient of friction after it is cured.

In one embodiment, a friction-inducing material 20 can be bonded to or otherwise disposed on (e.g., adhered with an organic and/or inorganic adhesive or binder, deposited so as to lay on the surface, etc.) all, most or at least a substantial portion of the major surface area of both sides or major faces of the at least one inorganic layer 18 so as to define a higher friction area on each side of the at least one inorganic layer 18. Likewise, a frictionless, low friction or at least a lower friction layer 22 can be disposed so as to cover all, most or at least a substantial portion of each higher friction area and define an exposed surface area 26 on each side of the mounting mat 16, with each exposed surface area 26 exhibiting a lower static coefficient of friction than that of its corresponding higher friction area lying thereunder. The friction-inducing material on each side of the at least one inorganic layer 18 can be different or the same, and the lower friction layer 22 covering the portion of each higher friction area can be the same or different.

The exposed surface area 26 of the mounting mat 16, defined by the lower friction layer 22, can exhibit a relatively low static coefficient of friction, while the mounting mat 16 is used to mount a pollution control element 14 in a housing 12 of a pollution control device 10. In addition, at some time during the operation of the pollution control device 10, a substantial portion of the higher friction area becomes exposed and the corresponding exposed surface area of the mat 16 exhibits a relatively higher static coefficient of friction. Compared to the working lifetime of the pollution control device (e.g., 10 or more years), the time it takes for the higher friction area to become exposed is considerably shorter (e.g., on the order of minutes, hours or maybe days), after the pollution control device is operated.

The lower friction layer 22 is operatively adapted so as to no longer cover a substantial portion of the higher friction area formed by the friction-inducing material 20, after the mounting mat 16 has been used to mount the pollution control element 14 in the housing 12 of the pollution control device 10. That is, after the mat 16 has been disposed between the pollution control element 14 and the housing 12, the lower friction layer 22 (*a*) is physically disrupted by the process of mounting the pollution control element 14 (i.e., the canning process), (b) degrades or decomposes at the operating temperature of the pollution control device 10, or both (a) and (b), and in this way, the underlying friction-inducing material 20 can be exposed. In one embodiment, for example, the lower friction layer 22 can be (a) made or otherwise configured (e.g., with a thickness, a material, or both) so as to be friable, easily torn, or otherwise physically disrupted by the process of mounting the pollution control element 14 into the housing 12 of the pollution control device 10, (b) made with or otherwise comprise material that will substantially burn-off (e.g., an organic material), oxidize, decompose, melt, or otherwise degrade (e.g., ammonium pentaborate) at the operating temperature of the pollution control device 10, or (c) both (a) and (b), and in this way, the underlying friction-inducing material 20 can be exposed.

In one embodiment, the lower friction layer 22 can be a layer of polymeric material such as, for example, high and/or low density polyethylene. High and low density polyethylene will completely oxidize at temperatures of greater than or equal to about 500° C. In addition, one or both major surfaces of the mounting mats used in many common pollution control device applications encounter surface temperatures of about 530° C. or even higher. Therefore, such a polyethylene lower friction layer will burn-off or oxidize to expose the underlying friction-inducing material 20, when used in many pollution control devices.

In another embodiment, friction-inducing material 20 is in the form of friction-inducing particles and the lower friction layer 22 is in the form of one or more layers of at least one lower friction material coating each of the friction-inducing particles. The lower friction material for coating the particles can be chosen so as to substantially burn-off (e.g., an organic material), oxidize, decompose, melt, or otherwise degrade (e.g., ammonium pentaborate) at the operating temperature of the pollution control device 10. The lower friction material for this coating can also be chosen so as to be friable, easily torn, or otherwise physically disrupted by the process of mounting the pollution control element 14 into the housing 12 of the pollution control device 10.

After the lower friction layer 22 no longer covers a substantial portion of the higher friction area of the friction-inducing material 20 (e.g., after the lower friction layer 22 has been exposed to pollution control device operating temperatures that burn-off the lower friction layer 22), the friction-inducing material 20 provides the mounting mat 16 with a high enough static coefficient of friction—between the mounting mat 16 and the pollution control element 14, or the mounting mat 16 and the housing 12, or both—allow the pollution control element 14 to be securely mounted (i.e., held) in place within the housing 12 at a significantly lower mount density or mounting pressure. Reducing the required mount density or mounting pressure of the mat 16, needed to effectively mount the pollution control element 14 in the housing 12, can enable: (a) all, most or at least more of the inorganic mounting materials used in layer(s) 18 to be less resilient, less expensive, or both (e.g., glass fibers), (b) all, most or at least less of the inorganic mounting materials used in layer(s) 18 to be more resilient, more expensive, or both (e.g., polycrystalline ceramic fibers), (c) all, most or at least more of the inorganic mounting materials used in layer(s) 18 to be biosoluble materials (e.g., biosoluble fibers), or any combination of (a), (b) and (c). Such biosoluble fibers can be found in published US patent application numbers US2009/0208385 and US2004/0234436, which are each incorporated herein by reference in its entirety. Being able to significantly increase the coefficient of friction on either or both major surfaces of the mounting mat 16 also has the potential of enabling the use of inorganic mounting materials for layer(s) 18 that, before now, could not be used in such mounting applications. This invention may also allow the use of a wider variety of mat mounting materials for any particular application than would normally be possible with its use. For example, mats made of only biosoluble fibers or only glass fibers may be suitable for use in applications where, before the present invention, only mats made with polycrystalline fibers, refractory ceramic fibers, or a combination of these two fiber types could be used.

The lower friction layer can comprise organic material that will completely, mostly or at least substantially burn, decompose or otherwise degrade at the operating temperature of the pollution control device so as to expose all, most or at least a substantial portion of the higher friction area. Examples of such a lower friction layer can include a wide range of single and multiple layer flexible films and coatings that are organic or substantially organic including, for example, those made of polyethylene (e.g., high and low density polyethylene), polypropylene, polyester, polyvinylchloride, polyurethane, acrylic, silicone rubber, and any other suitable flexible film with and without fillers.

The lower friction layer can also be dimensioned (e.g., with a thickness), comprised (e.g., of a material), configured (e.g., with areas of weakness such as, for example, perforated or otherwise weakened lines), or any combination thereof, so as to be friable, easily torn, or otherwise physically disrupted such that a portion of the higher friction area is exposed by the process of mounting the pollution control element into the housing of the pollution control device (i.e., the canning process).

The friction-inducing material can consist of, consist essentially of or at least comprise inorganic particles (e.g., single or multiple component particles with or without a hard coating), fibers, whiskers or any combination thereof. When the friction-inducing material comprises inorganic particles, it can be desirable for each particle to have a major axis dimension or size in the range of from about 70 μm to about 200 μm, about 50 μm to about 300 μm, about 20 μm to about 400 μm, or even particle sizes that are smaller and/or larger. The friction inducing material can comprises inorganic abrasive material, for example, in the form of particles, fibers, whiskers or any combination thereof. The friction inducing material can also comprise any suitable hard ceramic material such as, for example, at least one or a combination of alumina, silica, silicon carbide, zirconia, boron nitride, diamond, and pumice. The friction-inducing particles can be disposed on at least one side of the inorganic layer at a concentration level in the range of from about 10 $g/m^2$ to about 500 $g/m^2$.

It can be desirable for the lower friction layer to exhibit a maximum static coefficient of friction at room temperature (approximately 25° C.) of about 0.10, 0.15, 0.20, 0.25, or 0.30 and maybe for some applications even a maximum static coefficient of friction at room temperature (approximately 25° C.) of about 0.35, 0.40, or 0.45. It can be desirable for the friction-inducing material to exhibit a minimum static coefficient of friction at room temperature (approximately 25° C.) of about 0.30, 0.35, 0.40, 0.45, or 0.50, and maybe for some applications even a minimum static coefficient of friction at room temperature (approximately 25° C.) of about 0.25 or even less. The static coefficient of friction of the friction-inducing material at room temperature (approximately 25° C.) can be as high as permitted by the friction-inducing materials chosen such as, for example, up to and including about 0.55, 0.60, 0.65, 0.70, 0.75, 0.80, 0.85, 0.90, 0.95, 1.0, 1.05, 1.10, 1.15, 1.20, 1.25, 1.30, 1.35, 1.40, 1.45, 1.50 and maybe even higher. Typical inorganic mat materials used to make a base mounting mat can exhibit a static coefficient of friction at room temperature (approximately 25° C.) in the range of from about 0.15 to about 0.35. Whatever materials are chosen to make the present mounting mat, the lower friction layer will exhibit a lower static coefficient of friction than that exhibited by the friction-inducing material, and the friction-inducing material will have a higher static coefficient of friction than that of the inorganic mat materials used to make the base mounting mat.

The lower friction layer can have a thickness in the range of from about 1 micron up to and including about 2 mm, and preferably in the range of from about 10 microns up to and including about 500 microns (0.5 mm). In one embodiment of the present invention, the lower friction layer can be a high density polyethylene (HDPE) film having a thickness of about 12.7 microns and the friction-inducing material can be an 80 mesh alumina grit.

The inorganic materials can comprise, for example, inorganic fibers, intumescent material(s), or a combination of both. The at least one inorganic layer can comprise one or more intumescent layers, one or more non-intumescent layers, or a combination of both. For example, the mounting mat can have an intumescent layer defining one side of the at least one inorganic layer and a non-intumescent layer defining the other side. In addition, the at least one inorganic layer can comprise an intumescent layer sandwiched or otherwise disposed between two non-intumescent layers.

The pollution control device can exhibit a static coefficient of friction between the mounting mat and at least one or both of the pollution control element and the housing of less than or equal to about 0.4, or preferably in the range of from about 0.3 to about 0.1, while the pollution control element is being mounted in the housing (i.e., canned). The pollution control device can exhibit a static coefficient of friction between the mounting mat and at least one or both of the pollution control element and the housing of greater than or equal to about 0.35, or preferably in the range of from about 0.4 to about 0.7, initially after the pollution control element is mounted in the housing (e.g., when the lower friction layer is the type that is physically disrupted by the canning process). After about 8 hours of being operated, the pollution control device can exhibit a static coefficient of friction of greater than or equal to about 0.4, or preferably in the range of from about 0.35 to about 1.0 between the mounting mat and at least one of the pollution control element and the housing (e.g., when the lower friction layer is the type that burns or otherwise disintegrates at the operating temperatures of the pollution control device). The operating temperature of the pollution control device can result in the lower friction layer being subjected to a temperature in the range of from 100° C. up to 600° C. on the housing side and from about 300° C. up to about 1100° C. on the side of the pollution control element.

The mounting mat can exhibit an initial mount density after canning of less than or equal to about 1.2 g/cm$^3$, or desirably in the range of from about 0.25 g/cm$^3$ to about 1.05 g/cm$^3$, or preferably in the range of from about 0.10 g/cm$^3$ to about 1.0 g/cm$^3$. The present invention may enable the mount density of a given mounting mat to be reduced by at least 10%, 15%, 20%, 25%, 30%, 35%, 40%, 45% or 50%, while still preventing the mounted pollution control element from significantly moving (i.e., to the point of contacting the housing or otherwise sustaining damage) within the housing. The mounting mat can exhibit an initial mount pressure or normal pressure after canning, at room temperature, of less than or equal to about 500 kPa, or desirably in the range of from about 45 kPa to about 450 kPa, or preferably in the range of from about 25 kPa to about 250 kPa or about 15 kPa to about 150 kPa. The present invention may enable the mount pressure of a given mounting mat to be reduced by at least 10%, 15%, 20%, 25%, 30%, 35%, 40%, 45% or 50%, while still preventing the mounted pollution control element from significantly moving (i.e., to the point of contacting the housing or otherwise sustaining damage) within the housing. Because this invention can allow mounting mats to be used that exhibit lower mounting pressures and/or mount densities, a wider variety of mounting mat compositions and/or mounting mat materials can be used than would normally be possible for any particular application. As used herein, the term "mount pressure" refers to the pressure exerted by a mounting mat against a housing or a pollution control element mounted within the housing by using the mounting mat.

General Procedure for Making Mounting Mats

A mounting mat, according to the present invention, can be made by a method that comprises: (a) providing at least one inorganic layer comprising inorganic materials suitable for mounting a pollution control element in a housing of a pollution control device, with the least one inorganic layer having opposite sides and, and each of the opposite sides and defining a major surface area; (b) disposing a friction-inducing material on at least a portion of the major surface area, of at least one of the sides of the at least one inorganic layer, so as to define a higher friction area exhibiting a static coefficient of friction higher than that of the inorganic materials; and (c) disposing a lower friction layer so as to cover a portion of the higher friction area and define an exposed surface area of the mounting mat, with the exposed surface area exhibiting a lower static coefficient of friction than that of the higher friction area. The lower friction layer is operatively adapted so as to no longer cover a substantial portion of the higher friction area, after the mounting mat has been used to mount a pollution control element in a housing of a pollution control device. The inorganic layer(s) can be in the form of a web or individual pieces dimensioned (e.g., by cutting, molding or other shaping technique) for a desired mounting application. The step of disposing the friction-inducing material can comprise one or any combination of spraying, coating, sprinkling, otherwise disposing the friction-inducing material. The step of disposing the lower friction layer can comprise one or any combination of spraying, coating, laminating, or otherwise disposing the lower friction layer.

It can be desirable for the method to further comprise disposing an optional continuous or discontinuous bonding layer so as to adhere the friction-inducing material onto one or both sides of the at least one inorganic layer. The step of disposing the bonding layer can comprise one or any combination of spraying, coating or otherwise disposing the bonding layer. The bonding layer may be applied so as to at least partially adhere at least part of the lower friction layer to the at least one inorganic layer.

Figure 3:
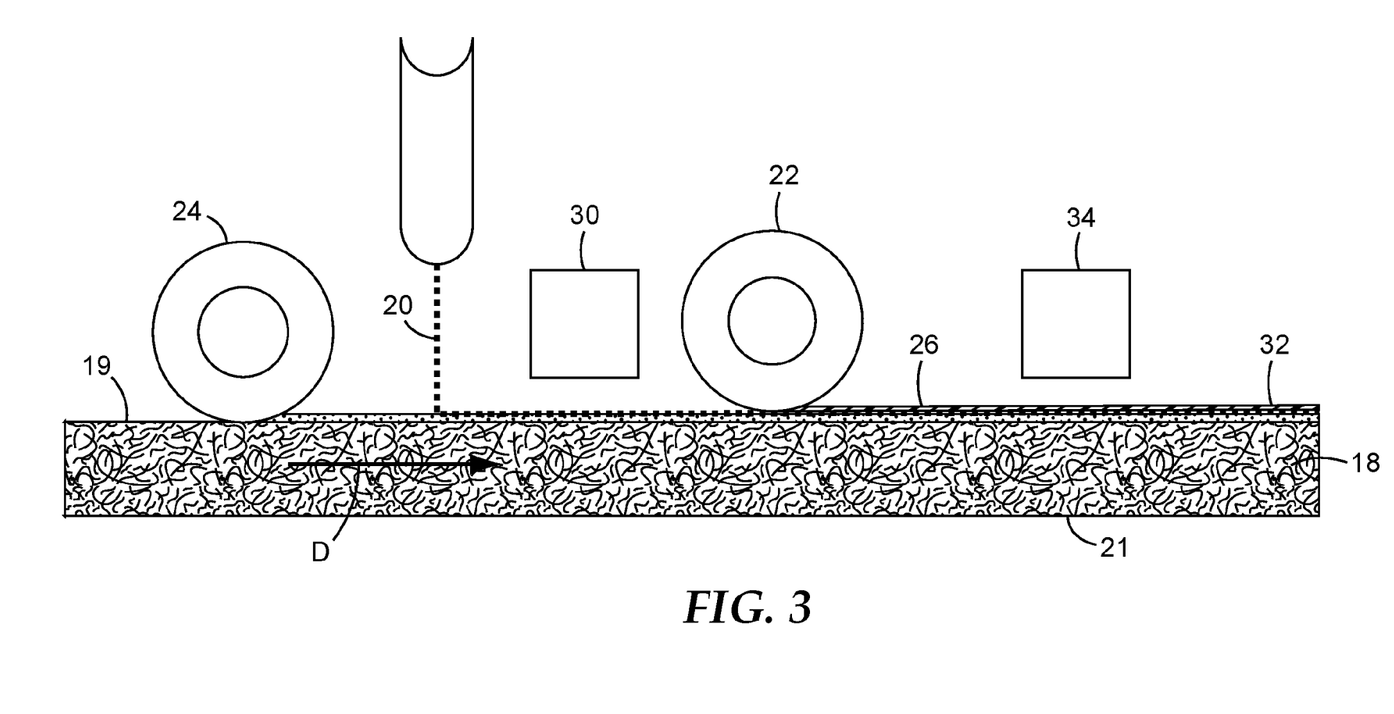
FIG. 3 illustrates one embodiment of a method of making a structure in accordance with the present invention.

Referring to FIG. 3, in one embodiment of a method of making a mounting mat 10 according to the present invention, a web of at least one inorganic layer 18 is transported along a production line in a downstream direction, indicated by the arrow D, using a conventional conveyor belt system. The web of inorganic layer(s) 18 can be made according to any conventional technique (e.g., conventional wetlaid or drylaid processes). As the inorganic layer(s) 18 moves downstream, a film, coating or layer 24 of a bonding material or agent (e.g., a hot melt or heat activated adhesive) is unrolled and deposited onto the major surface on the top side 19 of the inorganic layer(s) 18. Next, friction-inducing material 20 is deposited (e.g., sprinkled, sprayed, or dropped) onto the top surface of the just applied bonding film 24. After the friction-inducing material 20 is deposited onto the bonding film 24, the top side 19 of the web of inorganic layer(s) 18 is exposed to a source 30 activates the bonding agent 24, securing the friction-inducing material 20 in place on the top side 19 of the inorganic layer(s) 18. Such activation of the bonding agent can occur, for example, by passing the web through heated air (e.g., in an oven, under a heat lamp, etc.), in contact with a heated surface, under an Ultraviolet light source, or under an e-beam source, depending on what is needed to activate the bonding agent. After the web has passed the source of activation 30, a lower friction film, coating or layer 22 is laminated onto the top side 19 of inorganic layer(s) 18 so as to cover the deposited friction-inducing material 20. Optionally, the web 32 can be exposed to another activation source 34, if desired, to cause the films 24 and 22 to bond (e.g., by melting or fusing) together so as to secure the lower friction film 22 in place on the web 32. The resulting mounting mat web 32 can be either formed (e.g., die or laser cut) into individual mounting mats 16 or wound into a roll for subsequent converting into individual mounting mats 16.

In an alternative embodiment of the method shown in FIG. 3, a bonding agent (e.g., a water or solvent based adhesive) can be coated (e.g., sprayed or knife coated) so as to form a bonding layer 24 on the top side 19 of inorganic layer(s) 18. After the friction-inducing material 20 is deposited onto the bonding layer 24, the top side 19 of the web of inorganic layer(s) 18 is exposed to a source 30 that dries and/or cures the bonding agent 24, securing the friction-inducing material 20 in place on the side 19 of the inorganic layer(s) 18. Such drying and/or curing of the bonding agent can occur, for example, by passing the web through heated air (e.g., in an oven, under a heat lamp, etc.), in contact with a heated surface, under an Ultraviolet light source, or under an e-beam source, depending on the bonding agent used. After the web has passed the source 30, a layer 22 of lower friction material is coated (e.g., sprayed or knife coated) so as to cover the deposited friction-inducing material 20. Optionally, the web 32 can be exposed to another activation source 34, if desired, to dry and/or cure the lower friction layer 22 and, thereby, bond the layers 24 and 22 together so as to secure the lower friction layer 22 in place on the web 32.

The following Examples have been selected merely to further illustrate features, advantages, and other details of various embodiments of the present invention. It is to be expressly understood, however, that while the Examples serve this purpose, the particular details are not to be construed in a manner that would unduly limit the scope of this invention.

Test Methods

Static Coefficient of Friction:

The static coefficient of friction value is calculated from the amount of force needed to initially move two 1.75 inch by 1.75 inch square mounting mat test samples across a 409 stainless steel test surface, while the samples are under a selected normal pressure. The static coefficient of friction is defined as the peak force needed to cause the sample to initially begin sliding on the test surface divided by the area of the samples.

The equipment used to determine the static coefficient of friction of the test samples includes a center heated metal platen that is attached to a load frame and disposed between two outer heated metal platens. One outer platen is fixtured with an air cylinder capable of applying up to 10 pounds per square inch (psi) of pressure between the platens. One 409 stainless steel metal plate (approximately 2.15 inches wide, 2.24 inches long and 0.57 inches thick) is set into a shallow vertical slot approximately 0.57 inches deep set into each side of the center heated platen. A similar slot is formed in the interior facing side of each of the two outer metal platens. One inconel metal plate (approximately 2.15 inches wide, 2.24 inches long and 0.12 inches thick) is set into the slot of each outer platen. Four 0.4 inch by 0.4 inch deep grooves positioned ninety degrees to the moving direction of the load frame are formed on the exposed surface of each inconel metal plate. One mounting mat test sample is placed between each of the two 409 stainless steel metal plates and one corresponding inconel metal plate.

The load frame is attached to a load cell capable of measuring the force and displacement of the center platen. Both outer platens are set in fixtures capable being adjusted such that the two mat samples placed against the 409 stainless steel plates may be centered below the load frame. The load frame pulls the center platen vertically at a rate of 4 inches per minute during the test while the outer platens are stationary. Sufficient insulation and/or cooling is provided between the load cell and the heated center platen to prevent overheating of the load cell during testing. All samples are first heated to the test temperature and allowed to soak for 10 minutes before testing unless otherwise indicated.

Each grooved inconel metal plate is designed to prevent slippage between the corresponding outer metal platen and mat test sample. Each 409 stainless steel plate simulates the surface of a pollution control device housing. These stainless steel plates can be replaced with alternative plates made with other materials to simulate the surface of any other housing or pollution control element.

EXAMPLES

Bond Coat Composition A 600 grams of Grace #5 expanded vermiculite (W. R. Grace, Cambridge Mass.) and 2000 milliliters of water are placed in a Waring Commercial Heavy Duty Blender (model 37BL84 (CB6)) and mixed at low speed for a total of six minutes with three separate two minute cycles to produce a slurry. 50 parts by weight of this slurry is mixed with 10 parts by weight Nalco 2327 (Nalco Company, Naperville, Ill.) colloidal silica and 10 parts by weight 600BP latex (Wacker Chemie AG, Stuttgart, Germany).

Bond Coat Composition B 50 parts by weight of vermiculite slurry from Bond Coat Composition A is mixed with 50 parts by weight Nalco 2327, 30 parts by weight Dixie Clay (R. T. Vanderbilt Company, Inc., Norwalk, Conn.), and 5 parts by weight 600BP latex.

Coefficient of Friction Examples

Comparative Examples 1 and 2

1.75 inch by 1.75 inch square samples of 1600 grams per square meter of 3M™ Interam™ 800 Mounting mat were cut from sheets for testing.

Comparative Examples 3 and 4

Bond Coat Composition A was brushed onto 1.75 by 1.75 inch square samples of 1600 grams per square meter 3M™ Interam™ 800 mounting mat at a coating weight of 183 grams per square meter and "Duralum" G52 Brown Aluminum Oxide Grade 80 (Washington Mills Electro Minerals Corp., Niagara Falls, N.Y.) was sprinkled over the wet bond coat at a coating weight of 230 grams per square meter. The sample was dried before testing.

Examples 5 and 6

Dried samples prepared as in Comparative Examples 3 and 4 were lightly sprayed with 3M Super 77 adhesive (3M, St. Paul, Minn.) and covered with 0.75 mil thick High Density Polyethylene Film (Hilex Poly Company, LLC, Hartsville, S.C.).

Examples 7 and 8

Samples were prepared as in Examples 5 and 6 using 1200 gram per square meter MLS-2 blanket (Mitsubishi Plastic Composites America, Inc., Chesapeake, Va.). 954 grams per square meter Bond Coat Composition B was brushed on the sample and 387 grams per square meter "Duralum" G52 Brown Aluminum Oxide Grade P150 (Washington Mills Electro Minerals Corp., Niagara Falls, N.Y.) was sprinkled on the sample and the sample dried. The dried samples were lightly sprayed with 3M Super 77 adhesive (3M, St. Paul, Minn.) and covered with 0.5 mil thick High Density Polyethylene Film (Hilex Poly Company, LLC, Hartsville, S.C.).

TABLE 1

| Example | Test Condition | Static Coefficient of Friction |
|---|---|---|
| 1 | 25 degrees Centigrade | 0.31 |
| 2 | 200 degrees Centigrade | 0.38 |
| 3 | 25 degrees Centigrade | 0.51 |
| 4 | 200 degrees Centigrade | 0.57 |
| 5 | 25 degrees Centigrade | 0.25 |
| 6 | 200 degrees Centigrade | 0.54 |
| 7 | 25 degrees Centigrade | 0.18 |
| 8 | Soaked for one hour at 500 degrees Centigrade then tested at 25 degrees Centigrade | 0.45 |

A comparison of the above tabulated data for Examples 5 and 7 with that of Examples 6 and 8, respectively, reveals how dramatically the static coefficient of friction can change between the mounting mat and the housing, the mounting mat and the pollution control element, or both, by using the present invention. A comparison of Examples 6 and 8 also indicates how the size of friction-inducing particles can impact the static coefficient of friction. Example 6 used larger friction-inducing particles (Grade 80) and obtain a higher static coefficient of friction, while Example 8 used smaller friction-inducing particles (Grade 150) and obtain a lower static coefficient of friction.

Various Embodiments
Pollution Control Device Structure Embodiments

1. A structure for use in a pollution control device (e.g., a mounting mat for mounting a pollution control element in a housing of a pollution control device), the structure comprising:
    at least one inorganic layer (e.g., in the form of a web, sheet or mat) comprising inorganic materials suitable for use in (e.g., mounting a pollution control element in a housing of) a pollution control device, with the at least one inorganic layer having opposite sides, and each the side defining a major surface area;
    a friction-inducing material disposed on at least a portion of the major surface area, of at least one of the sides of the at least one inorganic layer, so as to define a higher friction area exhibiting a static coefficient of friction higher than that of the inorganic materials forming the major surface area; and
    a lower friction layer disposed so as to cover at least a portion of the higher friction area and define an exposed surface area of the structure, with the exposed surface area exhibiting a lower static coefficient of friction than that of the higher friction area,
    wherein the lower friction layer is operatively adapted so as to no longer cover a substantial portion of the higher friction area, after the structure has been used in (e.g., to mount a pollution control element in a housing of) a pollution control device.

2. The structure according to embodiment 1, wherein the lower friction layer comprises organic material that will degrade at the operating temperature of the pollution control device so as to expose a portion of the higher friction area.

3. The structure according to embodiment 1 or 2, wherein the lower friction layer comprises organic material that will burn at the operating temperature of the pollution control device so as to expose a portion of the higher friction area.

4. The structure according to embodiment 1 or 2, wherein the lower friction layer is dimensioned, comprised, configured, or any combination thereof, so as to be physically disrupted such that a portion of the higher friction area is exposed by the process of mounting the pollution control element into the housing of the pollution control device.

5. The structure according to any one of embodiments 1 to 4, wherein the exposed surface area of the structure defined by the lower friction layer exhibits a relatively low static coefficient of friction, while the structure is used in (e.g., to mount a pollution control element in a housing of) a pollution control device, and at some time during the operation of the pollution control device, the substantial portion of the higher friction area becomes exposed and exhibits a relatively higher static coefficient of friction.

6. The structure according to any one of embodiments 1 to 5, wherein the inorganic materials comprise inorganic fibers, intumescent materials, or a combination of both.

7. The structure according to any one of embodiments 1 to 6, wherein the at least one inorganic layer comprises an intumescent layer and a non-intumescent layer.

8. The structure according to any one of embodiments 1 to 7, wherein a friction-inducing material is disposed on at least a portion of the major surface area of both sides of the at least one inorganic layer so as to define a higher friction area on each side of the at least one inorganic layer, and a lower friction layer is disposed so as to cover a portion of each the higher friction area and define an exposed surface area on each side of the structure, with each exposed surface area exhibiting a lower static coefficient of friction than that of its corresponding higher friction area.

9. The structure according to embodiment 8, wherein the friction-inducing material on each side of the at least one inorganic layer is different or the same, and the lower friction layer covering a portion of each the higher friction area is the same or different.

10. The structure according to any one of embodiments 1 to 9, wherein the friction-inducing material comprises inorganic particles, fibers, whiskers or any combination thereof.

11. The structure according to embodiment 10, wherein the friction-inducing material comprises inorganic particles, with each particle having a major axis dimension in the range of from about 70 μm to about 200 μm.
12. The structure according to embodiment 10 or 11, wherein the friction-inducing material comprises inorganic fibers, with each inorganic fiber having a major axis dimension in the range of from about 50 μm to about 300 μm.
13. The structure according to any one of embodiments 10 to 12, wherein the friction-inducing material comprises inorganic whiskers, with each inorganic whisker having a major axis dimension in the range of from about 20 μm to about 400 μm.
14. The structure according to any one of embodiments 1 to 13, wherein the friction inducing material comprises inorganic abrasive material.
15. The structure according to any one of embodiments 1 to 14, wherein the friction inducing material comprises at least one or a combination of alumina, silica, silicon carbide, zirconia, boron nitride, diamond, and pumice.
16. The structure according to any one of embodiments 1 to 15, wherein the friction-inducing material comprises particles disposed on at least one side of the inorganic layer at a concentration level in the range of from about 10 $g/m^2$ to about 500 $g/m^2$.
17. The structure according to any one of embodiments 1 to 16, wherein the lower friction layer exhibits a maximum static coefficient of friction of about 0.35.
18. The structure according to any one of embodiments 1 to 17, wherein the friction-inducing material exhibits a minimum static coefficient of friction of about 0.25.
19. The structure according to any one of embodiments 1 to 18, further comprising a bonding layer disposed so as to adhere the friction-inducing material on at least the portion of the major surface area of at least one of the sides of the at least one inorganic layer.
20. The structure according to embodiment 19, wherein the bonding layer at least partially adheres at least part of the lower friction layer to the at least one inorganic layer so as to cover at least a portion of the higher friction area.

Pollution Control Device Embodiments

21. A pollution control device comprising:
    a housing;
    a pollution control element mounted in the housing; and
    a structure according to any one of embodiments 1 to 20,
    wherein the structure is disposed within the pollution control device (e.g., the structure is a mounting mat disposed between the pollution control element and the housing).
22. The pollution control device of embodiment 21, wherein the structure is a mounting mat, and the pollution control device exhibits a static coefficient of friction between the mounting mat and at least one of the pollution control element and the housing of less than or equal to about 0.4, while the pollution control element is being mounted in the housing.
23. The pollution control device of embodiment 21, wherein the structure is a mounting mat, and the pollution control device exhibits a static coefficient of friction between the mounting mat and at least one of the pollution control element and the housing of greater than or equal to about 0.35, initially after the pollution control element is mounted in the housing.
24. The pollution control device of any one of embodiments 21 to 23, wherein the structure is a mounting mat, and after 8 hours of being operated, the pollution control device exhibits a static coefficient of friction of greater than or equal to about 0.4, between the mounting mat and at least one of the pollution control element and the housing.
25. The pollution control device of any one of embodiments 21 to 24, wherein the structure exhibits a mount density of less than or equal to about 1.2 $g/cm^3$.
26. The pollution control device of any one of embodiments 21 to 25, wherein the structure is a mounting mat, and the mounting mat exhibits a mount pressure of less than or equal to about 500 kPa at room temperature.

Method Embodiments

27. A method of making a structure (e.g., a mounting mat) for use in (e.g., mounting a pollution control element in a housing of) a pollution control device, the method comprising:
    providing at least one inorganic layer comprising inorganic materials suitable for mounting a pollution control element in a housing of a pollution control device, with the at least one inorganic layer having opposite sides, and each of the opposite sides defining a major surface area;
    disposing a friction-inducing material on at least a portion of the major surface area, of at least one of the sides of the at least one inorganic layer, so as to define a higher friction area exhibiting a static coefficient of friction higher than that of the inorganic materials; and
    disposing a lower friction layer so as to cover a portion of the higher friction area and define an exposed surface area of the structure, with the exposed surface area exhibiting a lower static coefficient of friction than that of the higher friction area,
    wherein the lower friction layer is operatively adapted so as to no longer cover a substantial portion of the higher friction area, after the structure (e.g., a mounting mat) has been used in (e.g., to mount a pollution control element in a housing of) a pollution control device.

This invention may take on various modifications and alterations without departing from its spirit and scope. Accordingly, this invention is not limited to the above-described but is to be controlled by the limitations set forth in the following claims and any equivalents thereof. This invention may be suitably practiced in the absence of any element not specifically disclosed herein. All patents and patent applications cited above, including those in the Background section, are incorporated by reference into this document in total.

What is claimed is:

1. A structure for use in a pollution control device, said structure comprising:
    at least one inorganic layer comprising inorganic fibers suitable for use in a pollution control device, with said at least one inorganic layer having opposite sides, and each said side defining a major surface area;
    a friction-inducing inorganic material disposed on at least a portion of the major surface area, of at least one of the sides of said at least one inorganic layer, so as to define a higher friction area; and
    a lower friction layer comprising organic material disposed so as to cover at least a portion of said higher friction area and define an exposed surface area of said structure, with said exposed surface area exhibiting a lower static coefficient of friction than that of said higher friction area,
    wherein said lower friction layer is operatively adapted so as to no longer cover a substantial portion of said higher friction area, sometime after said structure has been used in a pollution control device.

2. The structure according to claim 1, wherein said lower friction layer at least one of (a) comprises organic material that will degrade at the operating temperature of the pollution control device so as to expose a portion of said higher friction area, (b) comprises organic material that will burn at the operating temperature of the pollution control device so as to expose a portion of said higher friction area, (c) is dimensioned, comprised, configured, or any combination thereof, so as to be physically disrupted such that a portion of said higher friction area is exposed by the process of assembling the pollution control device, or (d) any combination of (a), (b) and (c).

3. The structure according to claim 2, wherein said friction-inducing inorganic material comprises (a) inorganic particles, with each particle having a major axis dimension in the range of from about 70 µm to about 200 µm, (b) inorganic fibers, with each inorganic fiber having a major axis dimension in the range of from about 50 µm to about 300 µm, (c) inorganic whiskers, with each inorganic whisker having a major axis dimension in the range of from about 20 µm to about 400 µm, or (d) any combination of (a), (b) and (c).

4. The structure according to claim 1, wherein the exposed surface area of said structure defined by said lower friction layer exhibits a relatively low static coefficient of friction compared to that of the higher friction area, while said structure is used in the assembly of the pollution control device, and at some time during the operation of the pollution control device, the substantial portion of said higher friction area becomes exposed and exhibits a relatively higher static coefficient of friction compared to that of said lower friction layer.

5. The structure according to claim 1, wherein a friction-inducing inorganic material is disposed on at least a portion of the major surface area of both sides of said at least one inorganic layer so as to define a higher friction area on each side of said at least one inorganic layer, and a lower friction layer is disposed so as to cover a portion of each said higher friction area and define an exposed surface area on each side of said structure, with each said exposed surface area exhibiting a lower static coefficient of friction than that of its corresponding higher friction area.

6. The structure according to claim 1, wherein said friction-inducing inorganic material comprises (a) inorganic particles, with each particle having a major axis dimension in the range of from about 70 µm to about 200 µm, (b) inorganic fibers, with each inorganic fiber having a major axis dimension in the range of from about 50 µm to about 300 µm, (c) inorganic whiskers, with each inorganic whisker having a major axis dimension in the range of from about 20 µm to about 400 µm, or (d) any combination of (a), (b) and (c).

7. The structure according to claim 1, wherein said friction inducing material comprises inorganic abrasive material.

8. The structure according to claim 1, wherein said friction-inducing inorganic material comprises particles disposed on at least one side of said inorganic layer at a concentration level in the range of from about 10 g/m² to about 500 g/m².

9. The structure according to claim 1, wherein said lower friction layer exhibits a maximum static coefficient of friction of about 0.35.

10. The structure according to claim 1, wherein said friction-inducing inorganic material exhibits a minimum static coefficient of friction of about 0.25.

11. The structure according to claim 1, further comprising a bonding layer disposed so as to adhere said friction-inducing inorganic material on at least the portion of the major surface area of at least one of the sides of said at least one inorganic layer.

12. The structure according to claim 11, wherein said bonding layer at least partially adheres at least part of said lower friction layer to said at least one inorganic layer so as to cover at least a portion of said higher friction area.

13. A pollution control device comprising:
a housing;
a pollution control element mounted in said housing; and
a structure according to claim 1,
wherein said structure is disposed within said housing.

14. The pollution control device of claim 13, wherein said pollution control device exhibits a static coefficient of friction between said structure and at least one of said pollution control element and said housing of less than or equal to about 0.4, while said pollution control device is being assembled.

15. The pollution control device of claim 13, wherein said pollution control device exhibits a static coefficient of friction between said structure and at least one of said pollution control element and said housing of less than about 0.35, while said pollution control device is being assembled, and said pollution control device exhibits a static coefficient of friction between said structure and at least one of said pollution control element and said housing of greater than or equal to about 0.35, initially after said pollution control device is assembled.

16. The pollution control device of claim 13, wherein after 8 hours of being operated, said pollution control device exhibits a static coefficient of friction of greater than or equal to about 0.4, between said structure and at least one of said pollution control element and said housing.

17. The pollution control device of claim 13, wherein said structure exhibits (a) a mount density of less than or equal to about 1.2 g/cm³, (b) a mount pressure of less than or equal to about 500 kPa at room temperature, or (c) both (a) and (b).

18. The pollution control device of claim 13, wherein said lower friction layer at least one of (a) comprises organic material that will degrade at the operating temperature of said pollution control device so as to expose a portion of said higher friction area, (b) comprises organic material that will burn at the operating temperature of said pollution control device so as to expose a portion of said higher friction area, (c) is dimensioned, comprised, configured, or any combination thereof, so as to be physically disrupted such that a portion of said higher friction area is exposed by the process of assemblying said pollution control device, or (d) any combination of (a), (b) and (c).

19. The pollution control device of claim 13, wherein the exposed surface area of said structure defined by said lower friction layer exhibits a relatively low static coefficient of friction compared to that of the higher friction area, and at some time during the operation of said pollution control device, the substantial portion of said higher friction area becomes exposed and exhibits a relatively higher static coefficient of friction compared to that of said lower friction layer.

20. A method of making a structure for use in a pollution control device, said method comprising:
providing at least one inorganic layer comprising inorganic materials suitable for use in a pollution control device, with the at least one inorganic layer having opposite sides, and each of the opposite sides defining a major surface area;

disposing a friction-inducing inorganic material on at least a portion of the major surface area, of at least one of the sides of the at least one inorganic layer, so as to define a higher friction area; and disposing a lower friction layer so as to cover a portion of the higher friction area and define an exposed surface area of the structure, with the exposed surface area exhibiting a lower static coefficient of friction than that of said higher friction area, wherein the lower friction layer is operatively adapted so as to no longer cover a substantial portion of the higher friction area, sometime after the structure has been used in the pollution control device.

* * * * *